Figure 1:
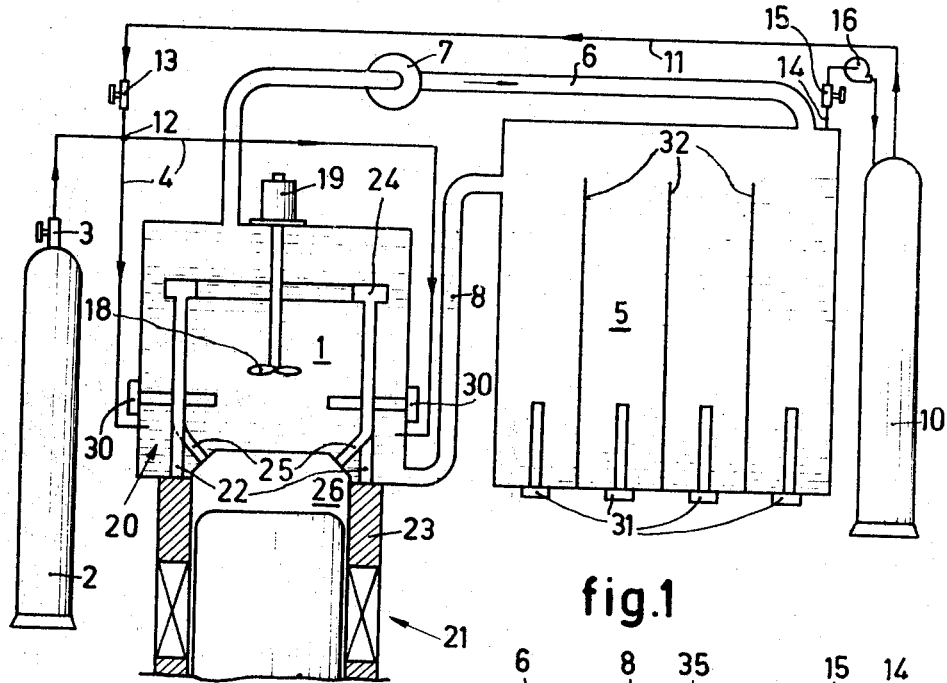

United States Patent
Schroder

[15] 3,662,740
[45] May 16, 1972

[54] HEATER SYSTEM

[72] Inventor: Johann Schroder, Aachen, Germany

[73] Assignee: U.S. Philips Corporation, New York, N.Y.

[22] Filed: Sept. 25, 1969

[21] Appl. No.: 860,893

[30] Foreign Application Priority Data

Sept. 30, 1968    Netherlands..........................6813988

[52] U.S. Cl............................................................126/263
[51] Int. Cl............................................................F24j 1/00
[58] Field of Search..............................126/263, 204; 165/46

[56] References Cited

UNITED STATES PATENTS

| | | | |
|---|---|---|---|
| 3,161,192 | 12/1964 | McCormack | 126/204 |
| 3,229,681 | 1/1966 | Gluckstein | 126/204 |
| 3,367,319 | 2/1968 | Carter, Jr. | 126/204 |
| 3,385,286 | 5/1968 | Jones | 126/204 |
| 3,450,127 | 6/1969 | Harwood, Jr. | 126/204 |

Primary Examiner—Charles J. Myhre
Attorney—Frank P. Trifari

[57] ABSTRACT

A heater system comprising a reaction vessel having a liquid metal mixture and a container of oxidant communicating therewith via a regulating valve. The oxidant reacts with the metal melt exothermically producing solid and/or liquid reaction products. The system furthermore comprises a spare container filled with the same metal mixture, this spare container being in heat contact with the reaction vessel and in communication with said vessel through a supply duct and removal duct; pumping means are present for maintaining a continuous liquid flow from the reaction vessel to the spare container, all this in such manner that the formed reaction products settle in the spare container.

7 Claims, 3 Drawing Figures

INVENTOR.
JOHANN SCHRÖDER

BY

AGENT

HEATER SYSTEM

The invention relates to a heater system, particularly for the supply of heat to a heat exchanger in which a medium flows. This system comprises at least one reaction vessel containing a metal or a mixture of metals which is liquid at the operating temperature, and at least one container of an oxidant which is capable of reacting chemically and exothermically with the liquid in the reaction vessel in such manner that the reaction products are solid and/or liquid at the temperature and pressure prevailing in the reaction vessel. The container communicates communicating via at least one supply duct with the reaction vessel, and the system comprises a control device for metering the supply of oxidant to the reaction vessel, the system furthermore comprising at least one pumping device for circulating the liquid in the reaction vessel.

Heater systems of the above-described type are known and have the advantage of supplying heat independently of the surroundings in which they are situated. In other words, said heater systems supply heat without consuming air of combustion and without giving off gases of combustion; thus they are excellently suitable for use in places where no air of combustion is present or in places where pollution of air is undesirable or inadmissible.

Heater systems of the type to which the present invention relates may be used for the supply of heat to engines in which a working medium traverses a thermodynamic cycle between an expansion space which is at a high temperature and a compression space which is at a low temperature. Examples of such engines are hot-gas engines, gas turbines, thermoelectric generators. The supply of heat from the heater system to the engine may take place by contacting the heater of the engine, which usually will be a pipe heater through which the working medium flows on its way to and from the expansion space, with the liquid in the reaction vessel. If desirable, the heat transfer from the reaction vessel to the heater may also take place with a heat-transporting medium, for example, liquid NaK, which circulates in a system of pipes which is in heat-exchanging relationship on one side with the reaction vessel and on the other side with the heater.

The metal or mixture of metals in the reaction vessel may be constituted by one or more of the metals Li, Ca, Na, K, Mg, Al and/or one or more of the rare earth metals. These metals and especially combinations of said metals have the advantage of a comparatively low melting temperature and a large heat evolution per unit by volume. The oxidant may be formed by a halogen or a halogen compound, particularly fluorine or a fluorine compound. The oxidant is supplied to the reaction vessel in dosed quantities, the oxidant reacting with the metal while evolving heat. Salts are formed which are solid and/or liquid at the operating temperature.

In the known systems the formed salts may give rise to two difficulties. In the first place the concentration of these salts in the reaction vessel constantly increases during operation and hence the metal concentration decreases so that the conversion rate decreases and the heat evolution occurs more slowly as more salts are formed. Secondly the formed salts or salt mixtures generally have a higher melting point than the metals or metal alloys. The result of this is that said salts or mixtures of salts tend to deposit at colder places. Since the colder place is mainly formed by the heat-exchanger (heater) in which heat is withdrawn from the liquid in the reaction vessel, the formed salts or mixture of salts will deposit on the pipes of the heat exchanger. As a result these pipes are provided with a heat insulating layer which, of course, is extremely undesirable. Further difficulty occurs in that the formed salts or mixtures of salts, due to their larger specific gravity and lower miscibility with the liquid metal, tend to settle at undesired places in the reaction vessel and thus clog the ducts.

It is the object of the invention to mitigate the above-mentioned drawback; the invention is characterized in that the heater system comprises at least one spare container which is filled at least partly with the same metal or the same mixture of metals as the reaction vessel. The container is in heat-exchanging contact with a heat source, and the reaction vessel and the spare container communicate with each other via a liquid supply duct and a liquid outlet duct. The pumping device and/or a further pumping device maintain a flow of liquid from the reaction vessel to the spare container and back during operation, in such manner that the rate of flow in the reaction vessel is larger than in the spare container.

An advantage of the system according to the invention is that only a small part of the total quantity of metal or mixture of metals which is present in the system is present in the reaction vessel. This means that the supply of heat can very rapidly be started because for this purpose only the reaction vessel has to be brought to the melting temperature, after which the gaseous oxidant can be supplied and the reaction starts. While heat can be evolved in the reaction vessel and be supplied to the engine, the spare container can quietly be brought to operating temperature. This may be done by using a part of the heat evolved in the reaction vessel for that purpose, or by means of another heat source as an electric heating coil.

After everything is liquid, a flow of liquid from the reaction vessel to the spare container and back can continuously be produced by means of the pump or pumps. It is possible that the whole flow of liquid supplied by the pump or pumps passes both the reaction vessel and the spare container, and it also possible to conduct the total supplied flow of liquid through the reaction vessel and then a part through the spare container, while the other part flows back directly to the suction side of the pump. In both manners there is achieved a flow of liquid of a high concentration of salts constantly from the reaction vessel to the spare container, while a flow of liquid having a low concentration of salts is conducted from the spare container to the reaction vessel. Since the liquid in the spare container flows comparatively slowly, the salts, due to their larger specific gravity, will settle in the spare container. In this manner the salt concentration in the reaction vessel remains low, so that the reaction conditions for oxidant and metal are and remain as favorable as possible. Furthermore the salts formed by the reaction as a result of the rapid flow in the reaction vessel will occur in the liquid in a finely dispersed condition. As a result of this, said salts will have no opportunity of depositing on the heat exchanger pipes so that always a good heat passage is ensured.

In a further favorable embodiment of the system according to the invention, the heat source for heating the spare container is formed by the reaction vessel. The heat transfer can take place by the continuous flow of liquid from the reaction vessel to the spare container. Also it is possible to use a further heat transport system for the transport of heat from the reaction vessel to the spare container.

In another favorable embodiment of the system the reaction vessel comprises a heat transmitting wall incorporated in the spare container. In this embodiment, heat will flow directly from the reaction vessel to the spare container.

Another embodiment of the heater system in which the reaction vessel is constructed as a circulation channel in which a pumping device is incorporated for circulating the liquid, is characterized in that the liquid outlet duct and the liquid supply duct communicate with the channel at places of different pressures, said places viewed in the direction of circulation of the liquid, being situated one behind the other and preferably communicate with the part of the duct communicating with the outlet side of the pump and the part of the duct communicating with the suction side of the pump, respectively. In this embodiment a part of the liquid flowing through the reaction vessel will continuously flow back to the spare container due to the differential pressure between the outlet and supply ducts.

In a further favorable embodiment the spare container at room temperature is partly filled with metal or a mixture of metals while at the operating temperature said container is substantially entirely filled due to the thermal expansion only. A gas is present in the free space in the spare container above the metal, which gas is inert to the metal or mixture of metals.

Also present are means to maintain said gas at a given pressure, in which at least the supply duct opens at a level in the container which lies only slightly below the liquid level at the operating temperature, and in which sealing means are present to close the outlet duct until the operating temperature is reached. By closing the outlet duct until the operating temperature is reached, there is no danger that the reaction vessel is pumped empty during the starting period. Since the supply duct is in open communication with the gas space in the spare container, the initial filling of the reaction container is not critical. In the case of an excess of liquid, due to the expansion, the liquid can escape to the spare container through the supply duct. All this is constructed so that at the operating temperature both the orifice of the supply duct and that of the outlet duct in the spare container lie below the liquid level so that a circulation of liquid occurs as soon as the passage of the outlet duct is released.

In a further favorable embodiment the outlet duct opens into the spare container, its orifice being closed by a plate of material which melts and/or dissolves a short period of time prior to reaching the operating temperature.

In order to prevent the liquid from rocking strongly in the spare container, for example, when the heater system is used in vehicles, with all the undesirable consequences of this, the spare container may be divided into compartments by a number of partitions which extend from the bottom to slightly below the liquid level.

Figure 2:
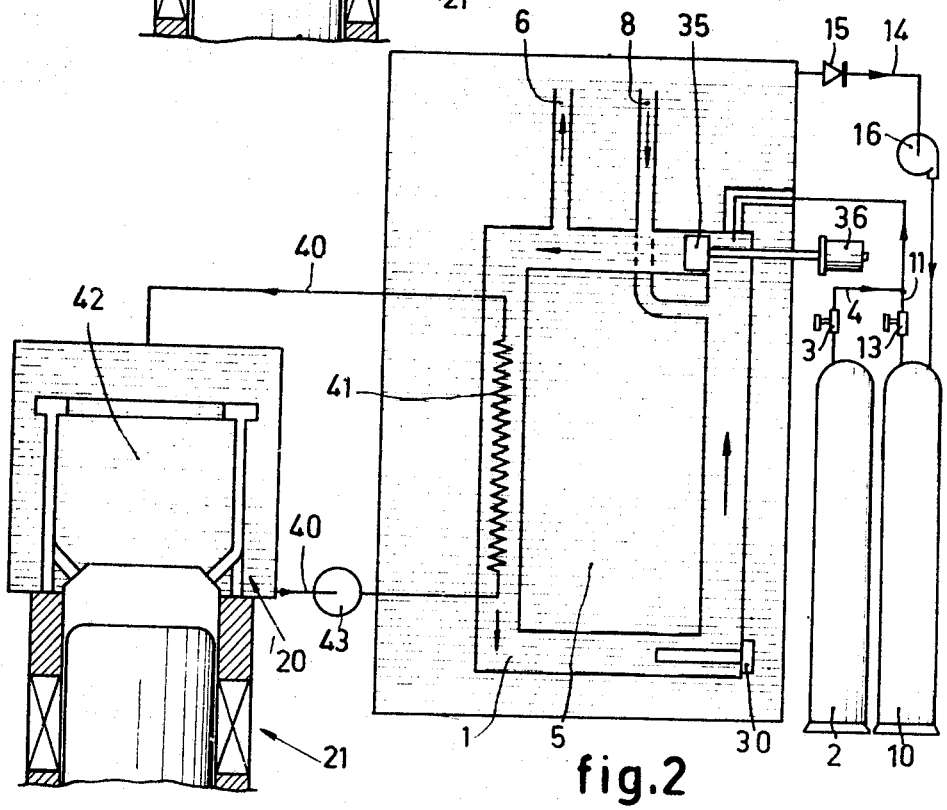
Figure 3:
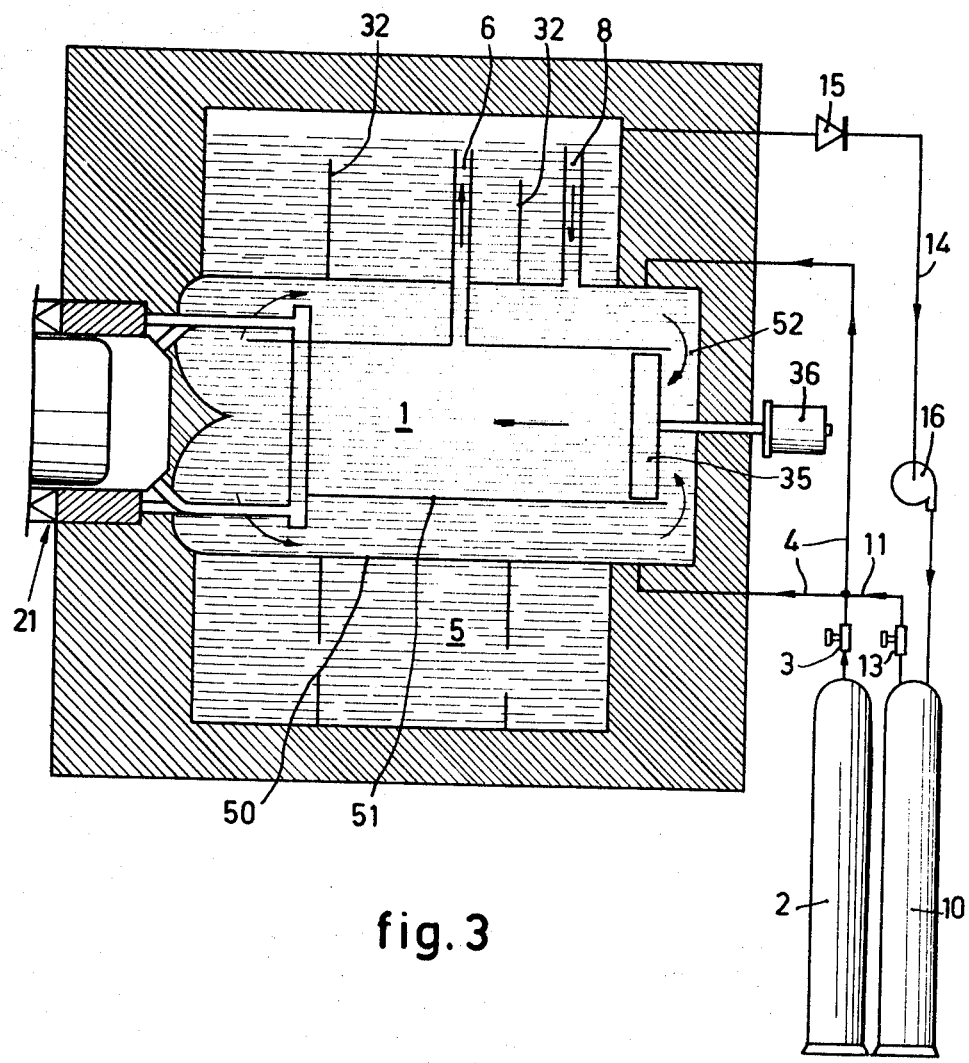

In order that the invention may be readily carried into effect, a few examples of heater systems will now be described in greater detail, by way of example with reference to the accompanying diagrammatic drawings which are not drawn to scale and in which FIGS. 1, 2, and 3 diagrammatically show not to scale three embodiments of heater systems in which, by way of example, the evolved heat is transferred to the heater of a hot-gas engine.

Referring now to FIG. 1, reference numeral 1 denotes a reaction vessel which is filled with a mixture of metals, substantially Li and Ca. Reference numeral 2 denotes a container containing an oxidant, for example, $SF_6$, which can react with the metal mixture in the reaction container 1 for evolving heat. The container 2 communicates with the reaction container 1 via a regulating valve 3 and a number of oxidant supply ducts 4 of which two are shown in the drawing. Reference numeral 5 denotes a spare container which contains the same metal mixture as the reaction vessel. The spare container communicates, via an outlet duct 6 in which a pump 7 is incorporated with the reaction vessel 1. The spare container 5 furthermore communicates with the reaction vessel 1 by means of a supply duct 8. The outlet duct 6 opens into the upper side of the spare container 5, while the supply duct 8 opens below the liquid level at operating temperature. The heater system furthermore comprises a container 10 containing an inert gas, for example, He or Ar. This container 10 communicates, via a gas supply duct 11, at the area 12 with the supply ducts 4. In the supply duct 11 a regulating valve 13 is provided. The container 10 furthermore communicates, via an outlet duct 14 with regulating valve 15 and compressor incorporated therein, with the spare container 5. A stirrer 18 coupled to an electric motor 19, is immersed in the reaction container 1. A heater 20 of a hot gas engine 21 is arranged in the reaction vessel 1. This heater comprises a number of pipes 22 arranged in a ring which communicates at one end with the regenerator 23 of the hot-gas engine 21, and at the other end with an annular duct 24, and comprises a number of pipes 25 which communicate the annular duct 24 with the expansion space 26 of the hot gas engine.

The operation of this system is as follows: Initially the whole system is at the ambient temperatures so that the metal in the reaction vessel 1 and the spare container 5 is solid. In order to enable the reaction in the reaction vessel 1, the metal mixture should first be melted, so that oxidant can then be introduced into the reaction vessel 1 from the container 2 via supply ducts 4. The heating to melting temperature occurs by means of electric heating devices 30. Simultaneously with the heating devices 30, the heating devices 31 in the spare container 5 are energized. Since the quantity of metal in the reaction container is small with respect to that present in the spare container 5, the reaction vessel will reach its temperature far more rapidly than the spare container. This means that the reaction can rapidly be started in which, due to the supply of $SF_6$ to the reaction vessel 1 dosed by means of the regulating valve 3, a chemical reaction occurs between the oxidant and the metal, during which thermal energy is liberated. This thermal energy is transferred to the working medium which flows through the heater 20 of the hot-gas engine. In order to obtain a good contact between the liquid metal and the heater pipes 22 and 25, a stirrer 18 is arranged in the reaction vessel 1 and is started as soon as the metal is liquid. As a result of said stirring, the metal comes in a good contact with the heater pipes, so that a good heat transfer is obtained.

The reaction vessel contains a quantity of mixture such that at the operating temperature, the vessel is just filled with liquid due to the thermal expansion. Any excess can flow away via the ducts 6 or 8 to the spare container. The spare container 5 contains a quantity of metal mixture, such that at the operating temperature, this container is also substantially filled with liquid, while the small space above it is filled with inert gas, for example, Ar, from the container 10. This gas from the container 10 is supplied to the ducts 4, via duct 11, the supplied quantity being regulated by means of the valve 13 in such manner that such a large flow of gas occurs through the ducts 4 that no liquid can enter the ducts 4. The inert gas supplied to the reaction vessel 1 can flow to the spare container 5, via the duct 6, and thence via duct 14, valve 15, and compressor 16 it can be returned to the container 10. At the instant the metal in the spare container 5 has also liquefied, the pump 7 is actuated. Due to the pumping action, a flow of liquid is obtained through duct 6 from the reaction vessel 1 to the spare container 5. A flow of liquid also occurs through the duct 6 from the spare container 5 to the reaction vessel 1. The flow of liquid removed from the reaction vessel through the duct 6 will contain salts formed during the reaction in said container. These salts which are solid and/or liquid have a higher specific gravity than the liquid metal. Furthermore said salts show only a slight miscibility with the liquid metal. In the spare container the liquid flows at a low rate so that the salts obtain an opportunity of settling in said container. The flow of liquid which flows back to the reaction vessel via the duct 8 contains substantially no salt. In this manner an increase of the salt concentration in the reaction vessel is counteracted so that the reaction conditions are and remain favourable. A great advantage of this system is that the salts now obtain substantially no opportunity of depositing in a solid form on the heater pipes, so that the heat transfer always remains satisfactory.

During operation the electric heating devices need naturally not be energized. In the reaction vessel 1, a sufficient thermal energy is developed for maintaining the operating temperature, while a part of said energy is conducted with the liquid through duct 6 to the spare container 5, so that there the operating temperature is also maintained.

Melting of the metal mixture may occur, instead of electrically, by means of a burner or another chemical reaction, or by causing the hot-gas engine to operate temporarily as a heat pump.

Partitions 32 are provided in the spare container 5 so as to prevent the liquid therein from rocking too much as a result of shocks. These partitions may be perforated, if desirable.

FIG. 2 shows a slightly varied form of the heat system shown in FIG. 1. In this figure corresponding components are referred to by the same reference numerals. The reaction vessel 1 has the form of a bypass having a heat transmitting wall which is accomodated in the spare container 5. The metal in the reaction vessel can again be melted by an electric heating device 30 or in any other suitable manner, if desirable. Oxidant, for example, $SF_6$, can be introduced into the reaction vessel 1, from the container 2, via a regulating valve 3, and duct 4. With the duct 4 communicates a duct 11 having a regulating valve 1, along which an inert gas, for example, Ar, can flow from the container 10 to the reaction vessel in such manner that such a large flow of medium always occurs in the duct 4, that no liquid metal can enter it. A pumping device 35 coupled to an electric motor 36 ensures the circulation at high speed of the liquid in the bypass 1. The container 10 communicates, via the duct 14 with a compressor 16 incorporated therein and control valve 15, with the spare container 5. An outlet duct 6 and a supply duct 8 furthermore communicate with the bypass. These ducts communicate with places where different pressures prevail during operation and that in such manner that the duct 6 communicates with a place having a higher pressure and duct 8 with a place having a lower pressure. The ducts 6 and 8 open into the spare container at a level which lies slightly below the liquid level at the operating temperature. Initially the duct 6 is closed by a plate of a material, for example, lanthanum (melting point 840° C) which melts shortly before reaching the operating temperature. If desirable said plate may be replaced by a controllable cock.

The heat evolved in the reaction container 1 is transferred to liquid NaK serving as a heat transporting medium which circulates in a system of ducts 40 and, at the area 41, becomes thermal energy from the reaction vessel and, at the area 42, supplies said heat to the heater 20 of the hot gas engine 21. A pump 43 ensures the circulation of the NaK.

The operation of the heater system is as follows. First the metal in the bypass 1 is melted by means of the heating device 30. Then pump 35 is actuated and valve 3 is opened so that oxidant can enter. Due to the reaction, heat is evolved which is partly supplied to the hot gas engine and partly serves for bringing the metal in the spare container 5 at the desired temperature.

The bypass contains a quantity of metal mixture such that upon reaching the operating temperature, it is filled entirely due to thermal expansion. Furthermore the spare container contains a quantity of metal such that initially the orifices of the ducts 6 and 8 lie in the gas space above it, while upon reaching the operating temperature, the liquid level lies above said orifices as a result of the thermal expansion. If duct 6 were not closed, liquid would initially be removed from the bypass through said duct as a result of the action of the pump 35, while liquid cannot yet be supplied via duct 8. So the bypass would be emptied. By closing the duct 6 by means of a plate which melts only a short time prior to reaching the operating temperature, said emptying is prevented. Upon reaching the operating temperature the plate melts and liquid will now continuously flow via duct 6 to the spare container while via duct 8 said removed liquid is replaced by "clean" liquid from the spare container. The salts removed from the bypass with the flow of liquid through the duct 6 will settle in the spare container 5. In this manner again a heater system having a short starting period is obtained, the liquid in the reaction vessel showing no increase in the concentration of salts.

FIG. 3 finally shows a heater system in which, as in FIG. 2, the reaction vessel 1 has the form of a bypass in which the heater 20 of the hot-gas engine 21 is provided directly in said bypass. The reaction vessel 1 is formed by a cylindrical container 50. In this container a second cylinder 51 is placed concentrically with the cylinder 50, the cylinder 51 being open at either end and not touching the end walls of the cylinder 50. One end of the cylinder 51 communicates with the annular duct 24 of the heater 20 of the hot gas engine. This means that the ring of heater pipes 22 and 25 forms as it were, a continuation of the cylinder 51. On the other side an aperture 52 is present between the cylinder 51 and the end wall of the cylinder 50. In this manner a bypass is obtained in which the pump 35 is placed in the cylinder 51. As regards construction and operation, the further components correspond to those of the system shown in FIG. 2 so that they require no further description.

From the above it may be obvious that the invention provides an extremely readily operating heater system which operates independently of its surroundings, has a short starting period, and a regular removal of the formed salts from the reaction vessel.

What is claimed is:

1. A system for supplying heat, comprising:
   a. a reaction vessel,
   b. a spare container, and inlet and outlet ducts communicating the vessel with the container,
   c. a reaction material formed of at least one metal that is a liquid in the operating temperature range of the system, some material in said vessel, the remaining material in the spare material,
   d. means containing an oxidant conveyable to the vessel for reaction with said liquid reaction material producing reaction products in the vessel which may include liquid and solid,
   e. a supply duct for conveying oxidant from the first container to said vessel,
   f. means for controlling the quantity of oxidant conveyed, and
   g. pump means for circulating liquid in the system,
   h. heat source means for providing heat to the vessel and the spare container and reaction material therein, for initiating operation of the system, whereby reaction products are conveyed out of the vessel to the spare container, and reaction material is conveyed from the spare container to the vessel, with the flow rate in the vessel being greater than in the spare container.

2. A heater system according to claim 1, wherein the heat source means for the spare container comprises a portion of said vessel in heat exchanging relationship with the container.

3. A heater system according to claim 2 wherein the heat source formed by the reaction vessel, comprises heat transmitting wall incorporated in the spare container.

4. A heater system according to claim 1 wherein the reaction vessel is constructed as a circulating channel having locations at different pressures, the pumping means is incorporated therein with the liquid outlet duct and the liquid supply duct communicating respectively (i) with said places of different pressures in the channel, and (ii) with the outlet side of the pump and the suction side of the pump.

5. A heater system according to claim 1, wherein the spare container at room temperature is partly filled with reaction material and at the operating temperature said container is substantially entirely filled due to thermal expansion, the space above the material in the spare container containing a gas inert to the material, the system further comprising means for maintaining said inert gas at a selected pressure, the supply duct opening being at a level in the spare container which is situated only slightly below the liquid level at the operating temperature, and sealing means for closing the outlet duct until the operating temperature is reached.

6. A heater system according to claim 3 wherein the outlet duct is situated at substantially the same level as the supply duct in the spare container, its orifice being closed by a plate of a material which, shortly prior to reaching the operating temperature, melts or dissolves.

7. A heater system according to claim 1 wherein the spare container is divided into compartments by partitions which extend from the bottom to slightly below the liquid level.

* * * * *